Figure 1:
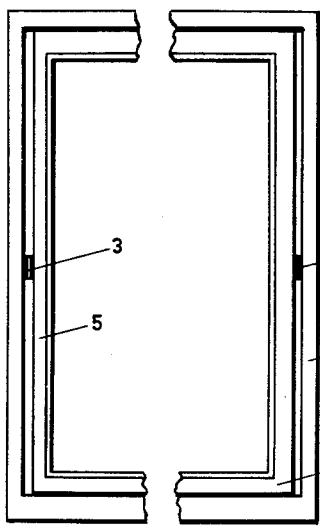

April 18, 1961 S. A. R. FLODELL 2,979,761
BEARING, ESPECIALLY FOR PERSPECTIVE WINDOWS
Filed Feb. 16, 1959

INVENTOR
Stig Axel Arne Flodell
BY

United States Patent Office 2,979,761
Patented Apr. 18, 1961

2,979,761
BEARING, ESPECIALLY FOR PERSPECTIVE WINDOWS

Stig Axel Rune Flodell, Bildradiogatan 16, Jarnbrott, Sweden

Filed Feb. 16, 1959, Ser. No. 793,453

Claims priority, application Sweden Aug. 5, 1958

4 Claims. (Cl. 16—140)

This invention relates to bearings comprising a bearing house attached to a stationary part and a turnable bearing portion with a pin which with its free end engages a fitting in a movable part, said turnable bearing portion journalled with friction in said bearing house.

The bearing according to the invention is especially adapted for perspective windows. At a previously known bearing of this kind, the turnable bearing portion is journalled in a bore in the bearing house having a bottom and being inserted in the window frame, said bore widening conically outwards from said bottom. In order to obtain the necessary friction, the turnable bearing portion has to be pressed with its head end into the bearing house by means of a turnbuckle in a fitting of the side piece of the window sash. A reaction force is thereby created which tends to bend the side pieces of the window sash inwards towards the center of the window. The window glass is thereby exposed to a detrimental stress which sometimes causes a break down of the glass.

The primary object of the invention is to overcome this drawback. The main feature of the invention is that the bearing house is provided with a bore extending axially through the bearing house which bore with two conical surfaces widens towards both ends, that the turnable bearing portion with its head portion, also being conically shaped in a corresponding way, is turnable while in contact with one of the conical surfaces of the bore which is passed through by the pin, and that the pin, having a non-circular cross section, at its head portion carries a disk having a conical mantle surface and being non-turnable on the pin, said mantle surface fitting in the other one of the conical surfaces of the bore, the pin provided with a nut for moving the disk towards said head portion so as to obtain the desired friction between on one hand the bearing house and on the other hand the head portion of the turnable bearing portion and the disk.

Figure 2:
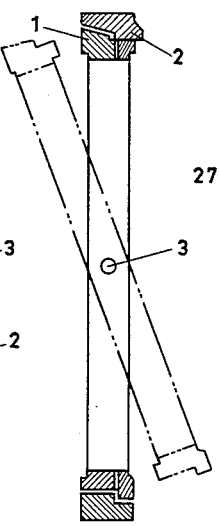
Figure 5:
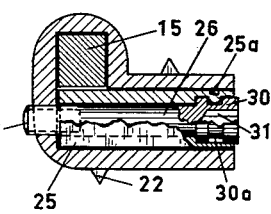
Figure 4:
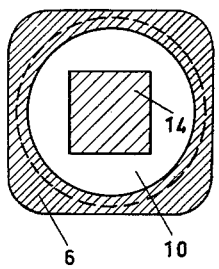
Figure 6:
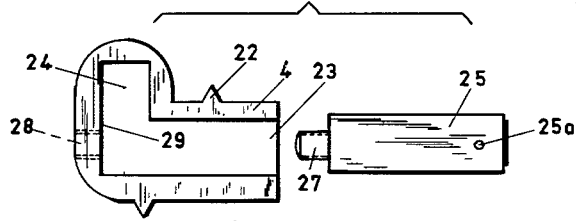
Figure 3:
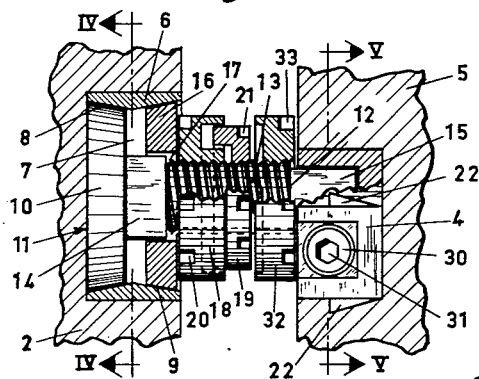

In the following, the invention will be elucidated with reference to the accompanying drawing. In the drawing:

Fig. 1 is a front elevation of a perspective window having a frame and being provided with a bearing according to the invention, Fig. 2 shows a vertical and longitudinal section through the perspective window in Fig. 1, Fig. 3 shows a partial and longitudinal section of a bearing according to the invention, Fig. 4 shows a cross section on the line IV—IV in Fig. 3, Fig. 5 shows a cross section on the line V—V in Fig. 3, Fig. 6 shows the fitting in the window sash included in the bearing and viewed from the side turned towards the window frame and showing the fitting dismounted.

In the drawing, 1 denotes the window sash and 2 denotes the window frame. The bearing between the parts 1 and 2 is denoted 3. Only the left hand bearing according to Fig. 1 will be described in the following. Both bearings are essentially identical but the fitting 4 in the side piece 5 of the window sash is preferably reversely arranged in relation to the fitting of the other bearing.

A bearing house 6 is attached in the frame 2, said house 6 having a bore 7 extending axially through the said house which bore with two conical surfaces 8 and 9 widens towards both ends. The head portion 10 with a conical mantle surface of the turnable bearing portion 11 has a pin 12 which completely passes through the bore 7 of the bearing house 6, is inserted from the inside into the bearing house 6. The central portion of the pin 12 is provided with screw threads 13. The portion 14 of said pin 12 situated adjacent the head portion 10 has a non-circular, preferably square, cross section, and the free end 15 of the pin 12 has also a non-circular, preferably square, cross section. A disk 16 is put on the portion 14 of the pin 12, said disk having a mantle surface being conical in correspondence to the surface 9 and being provided with a central aperture 17 shaped in correspondence with the cross section of the portion 14 of the pin 12. A turnbuckle nut 18 and a locking nut 19 are screwed onto the central portion of the pin 12. On their mantle surface the nuts are provided with recesses 20, 21 for engagement with the clow of a special tool for turning the nuts. By means of the turnbuckle nut 18, the disk 16 may be pressed with its conical mantle surface towards the conical surface 9 of the bearing house 6 simultaneously as the conical mantle surface of the head portion 10 is pressed against the conical surface 8 of the bearing house 6. It is hereby rendered possible to obtain the desired friction between the turnable bearing portion 11 and the bearing house 6.

When the window sash 1 is in its position, the end 15 of the pin 12 engages the fitting 4 which is inserted in the side portion 5 and is kept in this portion by means of ribs 22. The end 15 of the pin 12 is insertable from one end of the fitting through a slot 23 the inner end of which forms a space 24 for the end 15 of the pin 12. An oblong filling piece 25 is inserted in the slot 23, said piece 25 passed through by a locking screw 26 which is turnable but axially unmovable in the filling piece 25. The screw 26 is at one end 27 provided with threads fitting into corresponding threads in an aperture 28 in one end wall 29 of the slot 23. The opposite end of the screw is formed as a head 30 with a so called inner hexagon recess to be engaged by a special tool for turning the screw 26. When the screw 26 has been inserted in the filling piece 25, a small portion 25a of the same is by means of a mandrel punched into a peripheral notch 30a in the head 30 so as to prevent an axial movement of the screw relative the filling piece 25. The pin 12 is provided with a further nut 32 for the adjustment of the window sash 1 in lateral direction. Also this nut is provided with recesses 33 corresponding to the recesses 20, 21.

When by turning the turnbuckle nut 18 sufficient friction is obtained on one hand between the bearing house 6 and on the other hand between the turnable bearing portion 11 and the disk 16, and the nut 19 has been tightened against the nut 18, the window sash 1 is arranged in its seat by putting the fittings 4 onto the ends 15 of the pins 12 in such a way that these ends 15 are inserted through the end openings of the slots 23. When the ends 15 have been brought into the space 24 in the fittings 4, the filling pieces 25 are entered into the slots 23 and locked in the position shown in Fig. 5 by means of the screw 26. The nut 32 is turned in such a way that the window sash will have almost no clearance in lateral direction.

The shown and described embodiment is to be regarded only as an example and the different details of the bearing may be constructively varied in many ways within the scope of the invention. The fittings 4 could of course be arranged in the window sash 1 in such a way that the space for the end 15 of the pin 12 will be situated below the slot 23 instead of, as shown in the drawing, above the latter. The invention is of course applicable on windows which are turned around a vertical shaft.

In the foregoing, the invention has been described when used at a perspective window but it could of course be used wherever two parts shall be turnable relative each other. In this connection it should be mentioned that it is advantageous to use the bearing according to present invention especially at car doors and at the door to the baggage room of cars as it is often desired to stop said doors in different position. Such an adjustability is obtained at the device according to the invention by means of the adjustable friction and thus without use of spacious springs as previously used especially at doors to the baggage room. The bearing according to the invention could further with advantage be used at doors of furnitures, of kitchen cupboards, inner and outer doors, garage gates, etc.

What I claim is:

1. A bearing comprising a bearing house attached to a stationary part and a bearing portion with a pin and journalled with friction in said bearing house, said pin with its free end engaging a fitting in a movable part, said bearing house provided with a bore extending axially through said house and widening with two conical surfaces towards its two ends, said turnable bearing portion with its head, which tapers conically in a corresponding way, being turnable in contact with one of the conical surfaces of the bore which is passed through by said pin, the latter near its head portion having a non-circular cross section and carrying a disk which is non-turnable relative said pin and which has a conical mantle surface fitting in the other one of the conical surfaces of the bore, said pin provided with a turnbuckle nut adapted to move said disk towards said head portion so as to create a desired friction between on one hand the bearing house and on the other hand the head portion of the turnable bearing portion and said disk.

2. A bearing comprising a bearing house attached to a stationary part and a bearing portion with a pin and journalled with friction in said bearing house, said pin with its free end engaging a fitting in a movable part, said bearing house provided with a bore extending axially through said house and widening with two conical surfaces towards its two ends, said turnable bearing portion with its head, which tapers conically in a corresponding way, being turnable in contact with one of the conical surfaces of the bore which is passed through by said pin, the latter near its head portion having a non-circular cross section and carrying a disk which is non-turnable relative said pin and which has a conical mantle surface fitting in the other one of the conical surfaces of the bore, said pin provided with a turnbuckle nut adapted to move said disk towards said head portion so as to create a desired friction between on one hand the bearing house and on the other hand the head portion of the turnable bearing portion and said disk, the free end of said pin having a non-circular cross section and being insertable in a slot in said fitting from one end of said slot, the opposite end of the latter terminating in a space fitted for said end of said pin, said fitting comprising a filling piece insertable in said slot.

3. A bearing comprising a bearing house attached to a stationary part and a bearing portion with a pin and journalled with friction in said bearing house, said pin with its free end engaging a fitting in a movable part, said bearing house provided with a bore extending axially through said house and widening with two conical surfaces towards its two ends, said turnable bearing portion with its head, which tapers conically in a corresponding way, being turnable in contact with one of the conical surfaces of the bore which is passed through by said pin, the latter near its head portion having a non-circular cross section and carrying a disk which is non-turnable relative said pin and which has a conical mantle surface fitting in the other one of the conical surfaces of the bore, said pin provided with a turnbuckle nut adapted to move said disk towards said head portion so as to create a desired friction between on one hand the bearing house and on the other hand the head portion of the turnable bearing portion and said disk, the free end of said pin having a non-circular cross section and being insertable in a slot in said fitting from one end of said slot, the opposite end of the latter terminating in a space fitted for said end of said pin, said fitting comprising a filling piece insertable in said slot, said filling piece comprising a screw which is turnable in said piece but axially unmovable relative the same, said screw adapted to attach said filling piece to one end wall of said slot.

4. A bearing comprising a bearing house attached to a stationary part and a bearing portion with a pin and journalled with friction in said bearing house, said pin with its free end engaging a fitting in a movable part, said bearing house provided with a bore extending axially through said house and widening with two conical surfaces towards its two ends, said turnable bearing portion with its head, which tapers conically in a corresponding way, being turnable in contact with one of the conical surfaces of the bore which is passed through by said pin, the latter near its head portion having a non-circular cross section and carrying a disk which is non-turnable relative said pin and which has a conical mantle surface fitting in the other one of the conical surfaces of the bore, said pin provided with a turnbuckle nut adapted to move said disk towards said head portion so as to create a desired friction between on one hand the bearing house and on the other hand the head portion of the turnable bearing portion and said disk, said pin carrying on the inside of its free end an adjustment nut.

References Cited in the file of this patent

UNITED STATES PATENTS 1,896,057    Sheard _____ Jan. 31, 1933